United States Patent [19]

Momiyama

[11] 4,053,211

[45] Oct. 11, 1977

[54] FOCUS ADJUSTING DEVICE FOR TELEPHOTOGRAPHIC LENS

[75] Inventor: Kikuo Momiyama, Yokohama, Japan

[73] Assignee: Canon Kabushiki Kaisha, Tokyo, Japan

[21] Appl. No.: 714,597

[22] Filed: Aug. 16, 1976

[30] Foreign Application Priority Data

Aug. 20, 1975 Japan .................................. 50-101617

[51] Int. Cl.² .............................................. G02B 7/02
[52] U.S. Cl. .................................................. 350/255
[58] Field of Search ...................... 350/186, 187, 255; 354/195

[56] References Cited

FOREIGN PATENT DOCUMENTS 2,518,457  11/1975  Germany ............................. 350/255

*Primary Examiner*—F. L. Evans
*Attorney, Agent, or Firm*—Toren, McGeady and Stanger

[57] ABSTRACT

A focus adjusting device for a telephotographic lens which accomplishes a focusing operation by moving a part of a photographing optical system thereof. The device is provided with a non-linear cam whereby the rotational angle of an operating member is made to be greater for focusing on an object located at a long distance to ensure focusing accuracy and to be smaller for focusing on an object located at a short distance.

2 Claims, 3 Drawing Figures

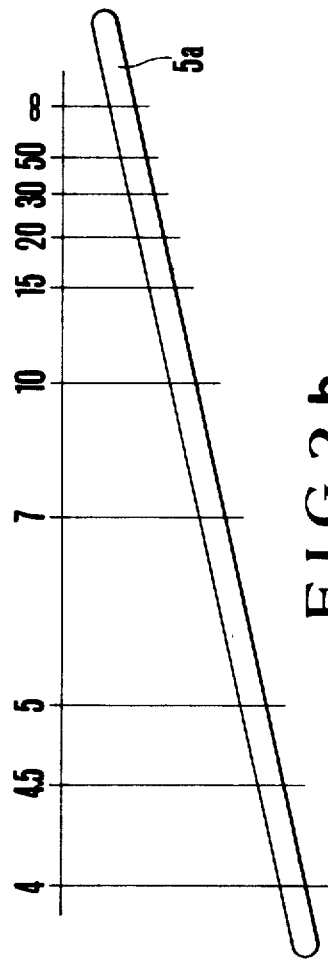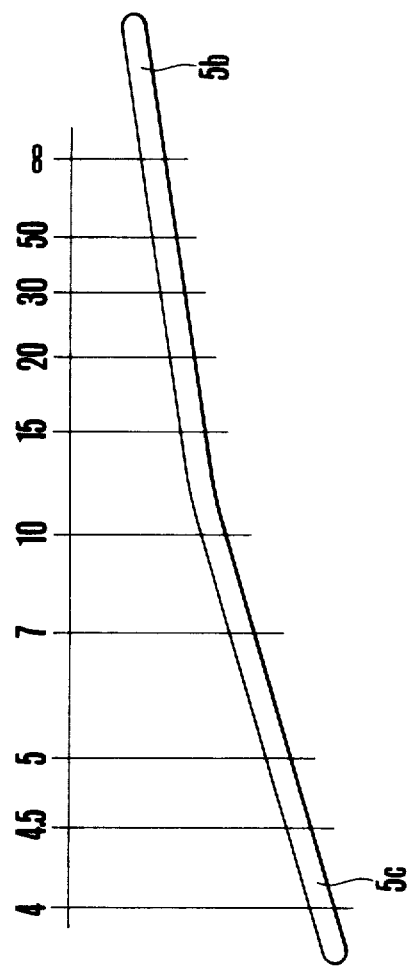

FOCUS ADJUSTING DEVICE FOR TELEPHOTOGRAPHIC LENS

This invention relates to an improvement in the focusing mechanism of a telephotographic lens system.

For the focusing mechanism of a photographing lens system, a method of using a helicoid screw to move a whole lens system back and forth in relation to the film surface in the direction of an optical axis for bringing the lens system into focus is generally adopted. A modification of this method is also known as a front lens focusing method wherein focusing is accomplished using a helicoid screw to move back and forth only a front lens which is a part of the photographing lens system.

In cases where the lens moving extent is great such as a part of an ultratelephotographic lens system or in an enlarged photographing arrangement, there is employed a focusing mechanism comprising a rack and a pinion.

It is a feature common to these methods now generally in use that the rotational angle $\theta$ of a focusing ring or knob is in a direct proportional relation to the moving extent $x'$ of a photographing or focusing lens. The relation can be expressed by $x' = k\theta$.

Let us further examine an example of the above mentioned method of moving a whole lens system by means of a helicoid screw. Assuming that the overall lead of the helicoid screw is L and that $\theta$ is expressed in a value of degree, the proportion constant $k$ can be expressed as $k = L/360$. Furthermore, from the well-known Newton's formula, the relation of the distance of a photographing object R to the lens moving extent $x'$ can be expressed by:

$$R = x + x' + 2f + \Delta x = \frac{f^2}{x'}$$

$f$: Focal distance
$\Delta$: Principal plane distance

Non, substituting the L-to-$\theta$ relation, the following can be obtained from the above formula:

$$R = \frac{360 f^2}{L\theta} + \frac{L\theta}{360} + 2f + \Delta$$

Then, by determining the values of $f$, $\Delta$ and lead L which are determined by the lens, the focusing distance R of the photographing object can be principally determined from the rotational angle $\theta$ of the focusing ring.

Referring to the above formula, in the normal distance from the photographing object, the terms from the second term on the right side of the formula are of negligibly small values compared with the first term. Taking into consideration only the first term for the right side of the formula, therefore, R can be regarded as in an inverse proportional relation to $\theta$ and a $\theta$ - R curve becomes hyperbolic. Accordingly, where the photographing object's distance is long, the value of R greatly varies even when $\theta$ varies slightly; while R does not greatly varies even when $\theta$ varies greatly if the object's distance is short. Furthermore, the rotational angle $\theta$ of the focusing ring becomes small when the lead L is great while $\theta$ becomes great when L is small. Since a focusing operation of the focusing ring is generally accomplished while holding the lens with the left hand, it is desirable that such focusing operation can be accomplished without shifting the hold of the lens from the left hand to the right hand and vice versa for photographing in the normal range of distance. In view of such, the lead L in general is determined in such a manner that the whole range of the rotational angles from the infinite distance to the shortest distance can be covered by turning the focusing ring between a half turn and a whole turn at the most. As a result of this, the lead becomes greater for a telephotographic lens which has a relatively great moving extent. In this type of lenses, therefore, the moving extent for a given degree of rotational angle becomes greater. On the other hand, the focal depth is principally determined as the F number is determined. Therefore, the focusing operation of a telephotographic lens requires fine adjustment as the focusing workability of it is relatively poor. This can be understood from an example wherein: At a normal distance of a photographing object 50f, the rotational angle of a focusing ring required for covering the depth of F number 8 is shown in the following table with the focal distance used as parameter:

| f (mm)      | 50     | 100   | 200   | 400   | 800   |
|-------------|--------|-------|-------|-------|-------|
| R = 50f (m) | 2.5    | 5     | 10    | 20    | 40    |
| L (mm)      | 12     | 22    | 32    | 36    | 46    |
| $\theta$° (F/8) | 15.83° | 8.64° | 5.94° | 5.28° | 4.13° |

As apparent from the above table, a lens of $f = 400$ mm must be adjusted within a range of angle which is one-third of the range required for a lens of $f = 50$ mm. In addition to such, there is another problem for a focusing mechanism of a telephotographic lens which is as described below:

In the method of moving the whole lens system, a greater driving force is required for moving a telephotographic lens which moves to a greater extent because the whole lens barrel assembly is large and heavy and such a heavy weight is on the focusing mechanism. This is a great disadvantage for operation.

The present applicant has previously filed a U.S. patent application under Ser. No. 570,958 for a telephotographic lens, wherein a part of a rear lens group is moved in the direction of an optical axis to minimize variation in aberration and to ensure excellent correction of the aberration of the whole lens system. Such a lens system is free from the above stated problem, because only a part of the rear lens group having a small diameter is moved.

It is a principal object of this invention to provide a telephotographic lens wherein a rear focusing method of moving a part of the lens system is adopted for a focusing mechanism; a nonlinear cam is provided as means for driving the focusing lens to make the lead of the focusing mechanism to be smaller for a long distance and greater for a short distance in such a manner that, in the range of long distances, the rotation angle of a focusing operation member is greater than a single lead focusing mechanism in response to a given degree of variation in the distance of photographing objects so that the focusing accuracy can be improved; at the same time, the lead is arranged to be greater in the range of shorter distances and this facilitates the focusing operation to follow variation in the object's distance in the short distance range; and yet, the total rotational angle of a focusing ring is about equal to that of the conventional helicoidal single lead mechanism although the bove stated shortcoming of the conventional single lead mechanism is eliminated.

Some examples of using a nonlinear cam for a focusing mechanism have been known. However, they represent a focusing cam mechanism arranged for a focusing provided with graduation which indicates values of distance in such a manner that a relation of Guide Number = Stop Value × Distance can be maintained when a guide number is set for flash photographing. For such arrangement, a total lens moving method must be adopted with the lens limited to a standard or wide-angle lens which weighs light and which has a short moving distance. The present invention, therefore, completely differs from such known arrangement both in the purpose and the way of attaining it.

The reason for adopting the rear focusing method of moving only the rear lens group which have a smaller diameter for this invention lies in that the cam arrangement adopted in accordance with the invention has a lesser contact ratio than a helicoid screw and is not capable of bearing a heavy load of a telephotographic lens. To cope with such a heavy load, there is a method of providing a block key either on the side of the lens or the lens mounting side while providing a ball bearing on the other side in such a way as to insert the block key into the ball bearing as practiced in a TV camera. However, it is still difficult to bear such a load by a cam arrangement when the load is naturally shifted by gravity to the direction of the optical axis as in the case of photographing at an angle of elevation. Thus, a focusing method of moving a part of the lens system is prerequisite to the use of a nonlinear cam. Further objects, advantages and features of this invention will become apparent from the following description of a preferred embodiment taken in conjunction with the accompanying drawings, in which:

FIG. 2 is a development view illustrating the relation of the distance graduation of a distance adjusting operation ring to a cam groove portion, FIG. 2a representing a conventional linear cam and FIG. 2b a nonlinear cam provided in accordance with this invention.

Figure 1:
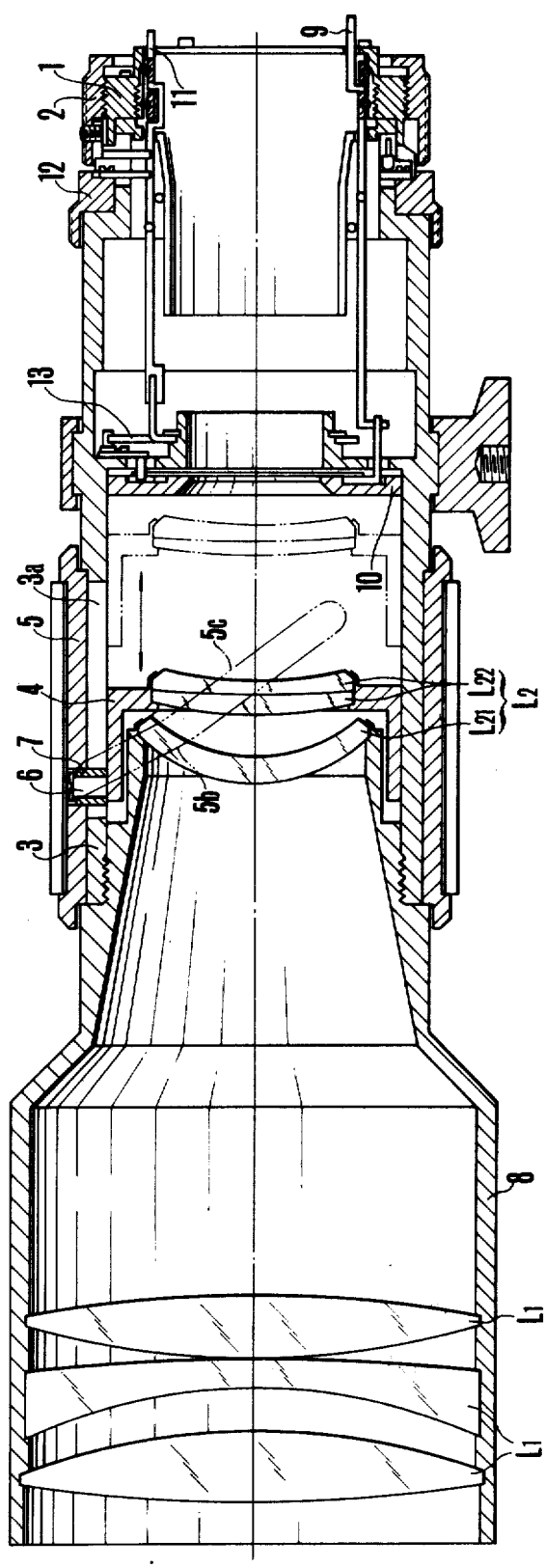
FIG. 1 is a sectional view illustrating, as an embodiment example, a telephotographic lens system of this invention.

In the illustrated example of embodiment, distance adjustment is effected by the rotation of the cam. Referring to FIG. 1, a front lens group L1 possesses a positive refractive power while a rear lens group L2 possesses a negative refractive power. The rear lens group L2 consists of a fixed lens group L2$_1$ and a movable lens group L2$_2$. A reference numeral 1 indicates a fixed portion of a lens barrel; 2 indicates a clamping ring provided for securing the lens barrel to an unillustrated camera body; 3 indicates a sliding guide barrel which is provided with a straight guide groove 3a and which is inseparably connected to the fixed portion 1 of the lens barrel; 4 indicates a movable barrel which is slidably fitted into the inner side of the sliding guide barrel 3 in such a way as to carry the movable lens group L2$_2$; 5 indicates an operation ring which is rotatably fitted onto the outside of the guide barrel 3 to serve as an operation member to be used for distance adjustment, the ring 5 being provided with cam grooves 5b and 5c; and 7 indicates a roller which is fitted to the outer circumference of the movable barrel 4 by a pin 6, the roller 7 being in engagement with the guide groove 3a of the guide barrel 3 and the cam grooves 5b and 5c of the operation ring 5. When the operation ring 5 rotates, the movable barrel 4 becomes to be able to slide straight in the direction of an optical axis inside the guide barrel 3 being guided by the guide groove 3a thereof. A reference numeral 8 indicates a lens carrying barrel which is secured to the guide barrel 3 to carry the front lens group L1 and the fixed lens group L2$_1$ included in the rear lens group L2; 9 indicates a stop drive lever which is provided for stopping a stop unit 10 down to a preset value in response to a stopping down action initiated on the side of the camera body; and 11 indicates a stop presetting lever which engages with a stop cam 13 to transmit a stop value signal to the stop unit 10. A stop operation ring 12 engages with the stop presetting lever 11.

FIG. 2 is a development view of the distance graduation and cam groove of the operation ring 5. In FIG. 2, 2a illustrates an example of straight cam arrangement having a lead value 45 while FIG. 2b illustrates, as an example, a nonlinear cam of the present invention. As shown in FIG. 2b, the lead at the portion 5b is 30 while the lead at the portion 5c is 60 and the overall moving extent is about equal to FIG. 2a. However, as apparent from FIG. 2a, in the case of a linear cam or a helicoid screw, the graduation intervals become too close to ensure good focusing accuracy for long distances and become very wide requiring too much rotation in the focusing operation for short distances. Whereas, in the case of the nonlinear cam arrangement, the graduation intervals are averaged to permit better operation.

The lens system arrangement described in the foregoing operates as follows: The lens barrel assembly is connected to a lens mounting part of the unillustrated camera body by means of the clamping ring 2. A desired stop value is selected by means of the stop operation ring 12. By this, the stop cam 13 is operated through a stop presetting lever 11 which engages with the stop operation ring 12. Then, the stop unit 10 is preset at the stop value and a stop value signal is transmitted also to the camera body through the lever 11. For distance adjustment, the operation ring 5 is rotated to cause the movable barrel 4 to slide straight in the direction of the optical axis at a lower speed for a long distance with the roller 7 thereof being pushed by the cam groove 5b of the ring 5 in the state of being engaged with the guide groove 3a of the guide barrel 3, the barrel 4 sliding at a higher speed for a short distance with the roller 7 being pushed by the cam groove 5c of the ring 5. Therefore, the movable lens group L2$_2$ carried by the moving barrel 4 changes their position on the optical axis. This in turn causes a change in the image forming position of the whole lens system on the optical axis accordingly. A camera operator, therefore, can accomplish long distance adjustment by operating the operation ring 5, while peeping through an unillustrated view finder of the camera, and thus by moving only the movable lens group L2$_2$ along the optical axis until a most sharp image is obtained.

Following the distance adjustment, an unillustrated release member is operated. Then, prior to shutter release, the stop drive lever 9 is actuated and the stop unit 10 is stopped down by a known method to the set stop value.

In accordance with this invention, as described in the foregoing, a telephotographic lens which requires a smaller turning force and is free from the inaccurate long distance focusing and the redundant rotating operation for short distance focusing that are inevitable disadvantages with the conventional telephotographic lens equipped with the helicoid screw type focusing mechanism can be obtained in a smaller size at a lower cost.

What is claimed is

1. In a telephotographic lens of a type to move a part of the lens system thereof for focusing, a focus adjusting device comprising;

a movable lens which is movably held along an optical axis;

an operating member which is rotatable for focusing; and a nonlinear cam means which moves said movable lens in response to the rotation of the operating member, the nonlinear cam means being provided with a cam face which is shaped in such a manner as to move the movable lens to a relatively shorter extent for focusing on an object to be photographed located at a greater distance in response to a given angle of rotation of the operating member and to a relatively greater extent for focusing on a object to be photographed located at a shorter distance in response to the given angle of rotation of the operating member.

2. A device as defined in claim 1, said nonlinear cam means being disposed on said operating member.

* * * * *